US012404887B2

United States Patent
Lacomb et al.

(10) Patent No.: US 12,404,887 B2
(45) Date of Patent: Sep. 2, 2025

(54) BRACKETING DEVICE FOR MANUFACTURING PARTS CLEANER AND METHODS THEREFOR

(71) Applicant: Regeneron Pharmaceuticals, Inc., Tarrytown, NY (US)

(72) Inventors: Patrick Lacomb, Albany, NY (US); Alyssa Shaw, Rensselaer, NY (US); Alexandra Dilillo, Albany, NY (US); Michael Bicknell, Averill Park, NY (US); Gregory McMullin, Rensselaer, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 0 days.

(21) Appl. No.: 18/612,279

(22) Filed: Mar. 21, 2024

(65) Prior Publication Data

US 2024/0318676 A1 Sep. 26, 2024

Related U.S. Application Data

(60) Provisional application No. 63/492,127, filed on Mar. 24, 2023.

(51) Int. Cl.
*F16B 2/24* (2006.01)
*F16M 13/02* (2006.01)

(52) U.S. Cl.
CPC ............ *F16B 2/245* (2013.01); *F16M 13/02* (2013.01)

(58) Field of Classification Search
CPC .............................. F16B 2/245; F16M 13/02
USPC ...................................................... 248/316.7
See application file for complete search history.

(56) References Cited

U.S. PATENT DOCUMENTS 10,243,339 B2 * 3/2019 Vaccaro .................... F16B 1/00
12,007,052 B2 * 6/2024 Wouters ................. F16L 3/127

FOREIGN PATENT DOCUMENTS

KR       20210101975 A       8/2021

OTHER PUBLICATIONS

International Search Report for PCT/US2024/020923, 3 pages, Jun. 18, 2024.

* cited by examiner

*Primary Examiner* — Todd M Epps
(74) *Attorney, Agent, or Firm* — Bookoff McAndrews, PLLC (57) ABSTRACT

A bracketing device configured to secure a connector, the bracketing device including: a first side section comprising: a first subsection comprising a first supporting bracket; a second subsection connected to the first subsection, wherein the second subsection comprises a first securing bracket pair; and a third subsection connected to the second subsection; a second side section comprising: a fourth subsection comprising a second supporting bracket; a fifth subsection connected to the fourth subsection, wherein the fifth subsection comprises a second securing bracket pair; and a sixth subsection connected to the fifth subsection; and an end connecting section positioned between the first side section and the second side section, wherein the end connecting section comprises an end bracket.

20 Claims, 5 Drawing Sheets

BRACKETING DEVICE FOR MANUFACTURING PARTS CLEANER AND METHODS THEREFOR

CROSS REFERENCE TO RELATED APPLICATIONS

This application claims priority to U.S. Provisional Application No. 63/492,127, filed on Mar. 24, 2023, which is incorporated by reference herein in its entirety.

TECHNICAL FIELD

Aspects of the present disclosure relate generally to bracketing devices, and more particularly to bracketing devices capable of securing laboratory parts during a washing/disinfecting process and associated methods

INTRODUCTION

Washer disinfectors ("washers") are used for automated cleaning of laboratory and/or surgical equipment. More particularly, the washers conventionally work by combining pressurized spray, water temperature, and detergent to clean the equipment that is loaded inside, which may be heat-resistant and/or heat-sensitive. Advantages of using a washer for an automated cleaning process are consistency, productivity, and control of essential parameters such as temperature, chemistry, and time. Issues may arise, however, if the loaded equipment becomes dislodged during the disinfecting process.

The present disclosure is accordingly directed to utilization of a bracketing device during washing and disinfecting of equipment that addresses the foregoing issues. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, a bracketing device is disclosed that secures a connector device during an equipment disinfecting process.

In one aspect, a bracketing device configured to secure a connector is provided. The bracketing device includes: a first side section comprising: a first subsection comprising a first supporting bracket; a second subsection connected to the first subsection, wherein the second subsection comprises a first securing bracket pair; and a third subsection connected to the second subsection; a second side section comprising: a fourth subsection comprising a second supporting bracket; a fifth subsection connected to the fourth subsection, wherein the fifth subsection comprises a second securing bracket pair; and a sixth subsection connected to the fifth subsection; and an end connecting section positioned between the first side section and the second side section, wherein the end connecting section comprises an end bracket.

In another aspect, an equipment securing device is provided. The equipment securing device, includes: a connector configured to secure an equipment part, wherein the connector comprises a first gripping component and a second gripping component; a bracketing device that is attached to and at least partially surrounds the connector, wherein the bracketing device comprises: a first side section comprising: a first subsection comprising a first supporting bracket; a second subsection connected to the first subsection, wherein the second subsection comprises a first securing bracket pair; and a third subsection connected to the second subsection; a second side section comprising: a fourth subsection comprising a second supporting bracket; a fifth subsection connected to the fourth subsection, wherein the fifth subsection comprises a second securing bracket pair; and a sixth subsection connected to the fifth subsection; and an end connecting section positioned between the first side section and the second side section, wherein the end connecting section comprises an end bracket; wherein the first securing bracket pair is clamped around the first gripping component, wherein the second securing bracket pair is clamped around the second gripping component, and wherein the end bracket is clamped on a first end of the connector.

In yet another aspect, a method of securing a connector to a bracketing device is provided, the method includes: clamping a first gripping component of the connector between a first securing bracket pair of the bracketing device; clamping a second gripping component of the connector between a second securing bracket pair of the bracketing device; and clamping a first end of the connector between an end bracket and first supporting bracket and a second supporting bracket of the bracketing device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings.

DETAILED DESCRIPTION OF THE EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of +10% of a stated or understood value.

One common issue that occurs during a disinfecting cycle in a washer (e.g., a STERIS single-chamber or multi-chamber washer/disinfector) is that equipment may fall off of a rack that it is placed on. Once a part is dislodged, it is considered unclean and needs to be re-washed. In these situations, another run of the disinfecting cycle needs to be initiated, which oftentimes contains very few parts (e.g., just those parts that became dislodged). A single run of the disinfecting cycle may take a minimum of 2 operators to initiate and may have a run duration of approximately three to four hours. Additionally, each run is extremely costly due to the variety of solutions used as well as the man hours and energy needed to run the cycle. Accordingly, the need to re-run the washer to account for the dislodged equipment is costly, time-consuming, and burdensome.

To minimize instances of equipment dislodgment, small parts are conventionally secured to a rack in the washer by a plastic Tri-Clamp (TC) connector. The TC connector may securely grip a piece of equipment and hold it in an upright position during the disinfecting cycle. However, due to the caustic and acidic solutions the washer uses, as well as the hot environment inside the washer, the TC connectors eventually expand and lose the ability to properly grip the equipment, which causes the equipment to become dislodged. In view of the foregoing, a need exists for a better securement solution for small equipment undergoing a disinfecting cycle in a washer.

Accordingly, embodiments of the present disclosure provide a bracketing device that is capable of attaching to a TC connector. More particularly, the bracketing device may ensure that the TC connector maintains its gripping properties so that any attached equipment to the TC connector is properly secured throughout a duration of the disinfection cycle. Furthermore, the bracketing device may be designed in such a way as to attach to the TC connector without interrupting the flow path of any cleaning solutions.

Reference will now be made in detail to the exemplary embodiments of the present disclosure described below and illustrated in the accompanying drawings. Wherever possible, the same reference numbers will be used throughout the drawings to refer to same or like parts. Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

Figure 1:
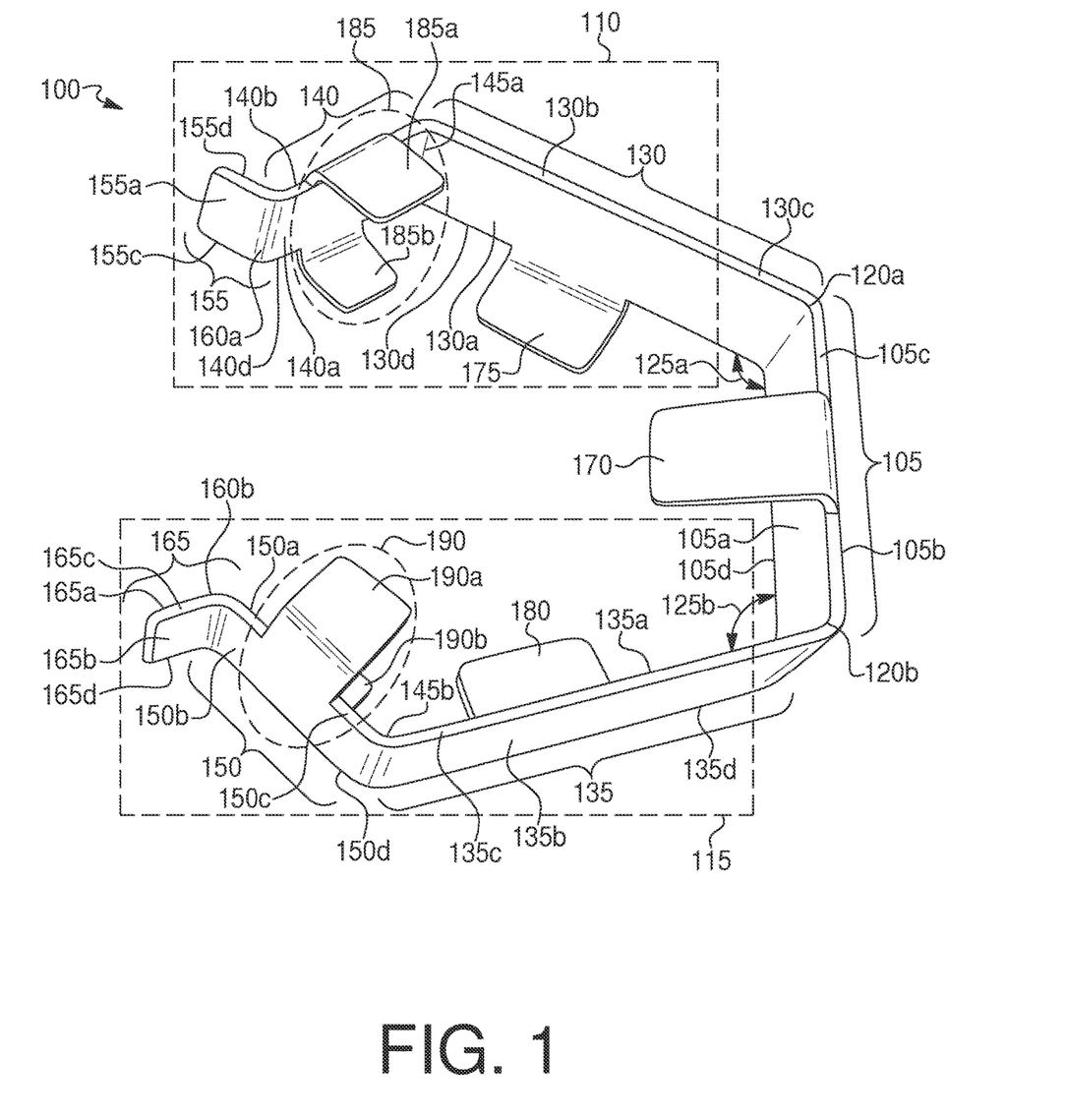
FIG. 1 depicts a perspective view of a bracketing device, according to various aspects of the present disclosure.

Referring to FIG. 1, a perspective view of an exemplary bracketing device is provided. In an embodiment, the bracketing device 100 may contain an end connecting section 105, a first side section 110, and a second side section 115.

In an embodiment, the end connecting section 105 may have a first surface 105a and a second surface 105b. In an embodiment, the first surface 105a may have substantially the same shape and/or dimensions as the second surface 105b. For instance, each of the first surface 105a and the second surface 105b may be rectangular in shape and may be of substantially the same length and width. Alternatively, in another embodiment, the first surface 105a may have a different shape and/or dimensions as the second surface 105b. For instance, both the first surface 105a and the second surface 105b may have the same shape (e.g., rectangular shape) but the first surface 105a may have a shorter length than the second surface 105b. In an embodiment, the end connecting section 105 may further have a first edge 105c and a second edge 105d. In an embodiment, the first edge 105c may be parallel to and positioned opposite of the second edge 105d. In an embodiment, each of the first edge 105c and the second edge 105d may have a thickness that is equivalent to or different than the other edge.

In an embodiment, extending from a first end 120a of the end connecting section 105 is a first side section 110 and extending from a second end 120b of the end connecting section 105 is a second side section 115. In an embodiment, each of the first side section 110 and the second side section 115 may extend away from the end connecting section 105 at an obtuse angle 125a, 125b, respectively, wherein the obtuse angle 125a formed between the connection of the end connecting section 105 and the first side section 110 may be the same or different angle as obtuse angle 125b formed between the connection of the end connecting section 105 and the second side section 115. Accordingly, in an embodiment, the first side section 110 may be non-parallel to the second side section 115.

In an embodiment, the first side section 110 may contain a first subsection 130 directly connected to the first end 120a of the end connecting section 105 and the second side section 115 may contain a first subsection 135 directly connected to the second end 120b of the end connecting section 105. Each of the first subsections 130, 135 may contain a first surface 130a, 135a and a second surface 130b, 135b, respectively. In an embodiment, for each of the first subsections 130, 135, the first surface 130a, 135a may have substantially the same shape and/or dimensions as the second surface 130b, 135b. Alternatively, in another embodiment, the first surface 130a, 135a may have a different shape and/or different dimensions as the second surface 135b, 135b. In an embodiment, the shape and/or dimensions of either first surface 130a or second surface 130b of the first subsection 130 may be the same or different as the shape and/or dimensions of either first surface 135a or second surface 135b of the first subsection 135. In an embodiment, each of the first subsection 130, 135 may have a first edge 130c, 135c and a second edge 130d, 135d. In an embodiment, the first edge 130c, 135c may be parallel to and positioned opposite of the second edge 130d, 135d. In an embodiment, each of the first edge 130c, 135c and the second edge 130d, 135d may have a thickness that is equivalent to or different than the other edge.

In an embodiment, the first side section 110 may contain a second subsection 140 directly connected to a distal end 145*a* of the first subsection 130 and the second side section 115 may contain a second subsection 150 directly connected to a distal end 145*b* of the first subsection 135. In an embodiment, each of the second subsections 140, 150 may extend away from the first subsections 130, 135 at an acute, 90-degree, or obtuse angle. In an embodiment, the angle formed between the second subsection 140 and the first subsection 130 may be the same or different angle as the angle formed between the second subsection 150 and the first subsection 135. In an embodiment, the shape and/or dimensions of the second subsections 140, 150 may be the same or different as the shape and/or dimensions of the first subsections 130, 135.

Each of the second subsections 140, 150 may contain a first surface 140*a*, 150*a* and a second surface 140*b*, 150*b*. In an embodiment, for each of the second subsections 140, 150, the first surface 140*a*, 150*a* may have substantially the same shape and/or dimensions as the second surface 140*b*, 150*b*. Alternatively, in another embodiment, the first surface 140*a*, 150*a* may have a different shape and/or different dimensions as the second surface 140*a*, 150*a*. In an embodiment, the shape and/or dimensions of either the first surface 140*a* or second surface 140*b* of the second subsection 140 may be the same or different as the shape and/or dimensions of either first surface 150*a* or second surface 150*b* of the second subsection 150. In an embodiment, each of the second subsections 140, 150 may have a first edge 140*c*, 150*c* and a second edge 140*d*, 150*d*. In an embodiment, the first edge 140*c*, 150*c* may be parallel to and positioned opposite of the second edge 140*d*, 150*d*. In an embodiment, each of the first edge 130*c*, 135*c* and the second edge 130*d*, 135*d* may have a thickness that is equivalent to or different than the other edge.

In an embodiment, the first side section 110 may contain a third subsection 155 directly connected to a distal end 160*a* of the second subsection 140 and the second side section 115 may contain a third subsection 165 directly connected to a distal end 160*b* of the second subsection 150. In an embodiment, each of the third subsections 155, 165 may extend away from the second subsections 140, 150 at an acute, 90-degree, or obtuse angle. In an embodiment, the angle formed between the third subsection 155 and the second subsection 140 may be the same or different angle as the angle formed between the third subsection 165 and the second subsection 150. In an embodiment, the shape and/or dimensions of the third subsections 155, 165 may be the same or different as the shape and/or dimensions of the second subsections 140, 150 and/or the first subsections 130, 135.

Each of the third subsections 155, 165 may contain a first surface 155*a*, 165*a* and a second surface 155*b*, 165*b*. In an embodiment, for each of the third subsections 155, 165, the first surface 155*a*, 165*a* may have substantially the same shape and/or dimensions as the second surface 155*b*, 165*b*. Alternatively, in another embodiment, the first surface 155*a*, 165*a* may have a different shape and/or different dimensions as the second surface 155*b*, 165*b*. In an embodiment, the shape and/or dimensions of either the first surface 155*a* or second surface 165*b* of the third subsection 155 may be the same or different as the shape and/or dimensions of either first surface 165*a* or second surface 165*b* of the third subsection 155. In an embodiment, each of the third subsections 155, 165 may have a first edge 155*c*, 165*c* and a second edge 155*d*, 165*d*. In an embodiment, the first edge 155*c*, 165*c* may be parallel to and positioned opposite of the second edge 155*d*, 165*d*. In an embodiment, each of the first edge 155*c*, 165*c* and the second edge 155*d*, 165*d* may have a thickness that is equivalent to or different than the other edge.

In an embodiment, some or all of the surfaces of any of the aforementioned sections of the bracketing device may be substantially solid throughout (e.g., as currently illustrated in FIG. 1). Alternatively, in another embodiment, some or all of the surfaces of any of the sections may be partially hollow. For instance, some or all of the surfaces of any of the sections may contain one or more holes (e.g., circular holes, oval-shaped holes, rectangular holes, etc.) contained therein. In an embodiment, each of the edges of the bracketing device may have a particular type of finishing (e.g., an edge may be a sharp edge, beveled edge, fillet edge, chamfered edge, etc.). The type of finishing may be the same for each of the edges, same for a subset of the edges, or different for each edge.

In an embodiment, the end connecting section 105 may contain an end bracket 170. In an embodiment, the end bracket 170 may be integrated into the first edge 105*c* at virtually any position along a length of the end connecting section 105. For instance, the end bracket 170 illustrated in FIG. 1 is positioned substantially in the middle of the end connecting section 105. In an embodiment, the end bracket 170 may be virtually any shape (e.g., square shaped, rectangular shaped, trapezoidal shaped, etc.). In an embodiment, the end bracket 170 may extend away from the first edge 105*c* towards an open central area of the bracketing device 100. More particularly, in an embodiment, the end bracket 170 may extend away from the first edge 105*c* at an angle (e.g., an acute angle, etc.).

In an embodiment, each of the first subsections 130, 135 may contain a support bracket 175, 180. In an embodiment, support bracket 175 may be integrated into the second edge 130*d* of the first subsection 130 and support bracket 180 may be integrated into the second edge 135*d* of the first subsection 135. In an embodiment, each of the support brackets 175, 180 may be positioned at virtually any position along a length of the first subsections 130, 135. For instance, the support brackets 175, 180 illustrated in FIG. 1 are positioned substantially in the middle of the first subsections 130, 135. In an embodiment, the support brackets 175, 180 may be virtually any shape (e.g., square-shaped, rectangular shaped, trapezoidal shaped, etc.). In an embodiment, each of the support brackets 175, 180 may extend away from the second edges 130*d*, 135*d* towards an opening central area of the bracketing device 100. More particularly, in an embodiment, each of the support brackets 175, 180 may extend away from the second edges 130*d*, 135*d* at an angle (e.g., a substantially 90-degree angle). In an embodiment, the bracketing device 100 may include two support brackets (e.g., as illustrated in FIG. 1) or, alternatively, may include more or less support brackets. For instance, the bracketing device 100 may contain only a single support bracket (e.g., only one of support brackets 175, 180).

In an embodiment, each of the second subsections 140, 150 may contain a securing bracket pair 185, 190. In an embodiment, each of securing bracket pair 185, 190 may contain a first securing bracket 185*a*, 190*a* integrated into the first edges 140*c*, 150*c* of the second subsections 140, 150 and a second securing bracket 185*b*, 190*b* integrated into the second edges 140*d*, 150*d* of the second subsections 140, 150. In an embodiment, the first securing brackets 185*a*, 190*a* and/or the second securing brackets 185*b*, 190*b* may be positioned at virtually any position along a length of the second subsections 140, 150. In an embodiment, the first and second securing brackets 185*a*, 185*b*, 190*a*, 190*b* may be virtually any shape (e.g., square-shaped, rectangular shaped, trapezoidal shaped, etc.) and may extend away from the first edges 140c, 150c and the second edges 140d, 150d towards an open central area of the bracketing device 100. More particularly, in an embodiment, each of the first and second securing brackets 185a, 185b, 190a, 190b may extend away from the first edges 140c, 150c and second edges 140d, 150d at an angle (e.g., a substantially 90-degree angle, an acute angle, etc.). In an embodiment, the first securing brackets 185a, 190a may extend away from the first edges 140c, 150c at an angle that is substantially the same or different than the angle that the second securing brackets 185b, 190b extends away from the second edge 140d, 150d.

In an embodiment, the bracketing device 100 may be composed of a material that is flexible enough to wrap around a TC connector (as further described herein) and that is also capable of withstanding the hot temperature environment of the washer and the acidic solutions utilized during the disinfecting process. For example, the bracketing device 100 may be composed of stainless steel of a predetermined gauge. In an embodiment, the entirety of the bracketing device 100 may be composed of the same material or, alternatively, portions of the bracketing device 100 may be composed of different materials. In an embodiment, the entirety of the bracketing device 100 may contain the same flexibility throughout. Alternatively, in another embodiment, some portions of the bracketing device 100 may contain greater flexibility than others. For example, end bracket 170, support brackets 175, 180, and/or securing bracket pairs 185, 190 may be more or less flexible than other portions of the bracketing device 100. In an embodiment, each of the side sections 110, 115 may have substantially the same dimensions (e.g., length, width, etc.) and the same number of brackets. Alternatively, in other embodiment, the dimensions and/or brackets on one of the side sections 110, 115 may be different than the dimensions and/or protrusions of another of the opposing sections, e.g., to accommodate TC connectors of varying shapes and sizes.

Figure 2:
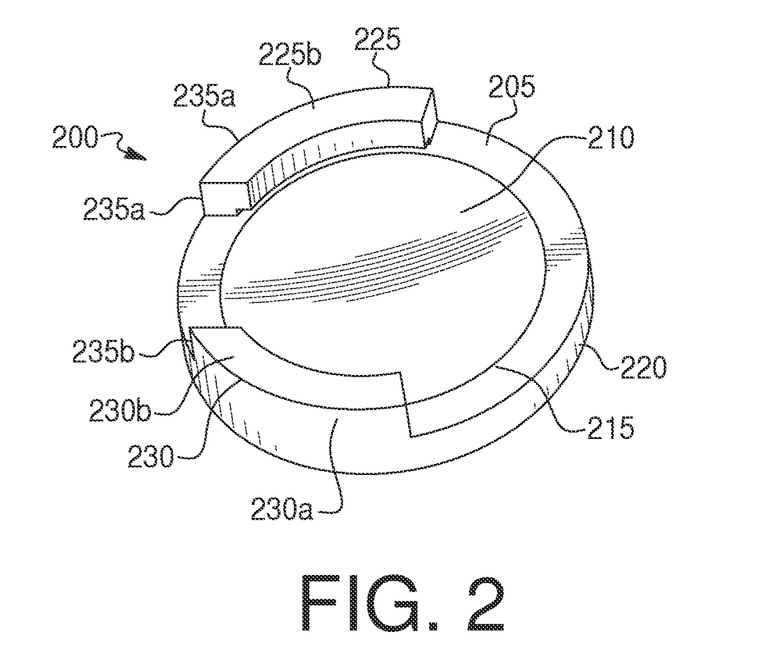
FIG. 2 depicts a perspective view of a connecting device configured to secure a piece of equipment, according to various aspects of the present disclosure.

In an embodiment, the bracketing device 100 may be configured to secure a conventional TC connector 200, as illustrated in FIG. 2. The TC connector 200 may be configured to attach and secure a variety of different types of equipment (e.g., tubes, bottles, connector components, etc.). In an embodiment, the TC connector 200 may be composed of a plastic, or other like polymer, and may come in varying sizes (e.g., 1½", ¾", etc.). In an embodiment, the TC connector 200 may be substantially solid throughout or, alternatively, may contain one or more holed portions therein.

In an embodiment, the TC connector 200 may be substantially bowl-shaped and may contain a surface 205 that intersects a concave portion 210 of the TC connector 200 at a first edge 215. In an embodiment, the surface 205 may be substantially circular in shape, e.g., as illustrated in FIG. 2, and may contain a consistent width that is defined by the first edge 215 and the second edge 220.

In an embodiment, the TC connector 200 may contain a first and second gripping component 225, 230, respectively. In an embodiment, the first gripping component 225 may be positioned virtually anywhere along the surface with respect to the second gripping component 230 (e.g., two gripping components 225, 230 may be positioned substantially next to each other, substantially across from one another, proximate to one another, etc.). In an embodiment, each of the first and second gripping component 225, 230 may contain a vertical segment 225a, 230a and an overhang segment 225b, 230b. In an embodiment, the vertical segments 225a, 230a may be directly connected to a portion of the surface 205 and may extend away from the surface 205 at substantially a 90-degree angle. In an embodiment, each of the overhang segments 225b, 230b may be connected to the vertical segments 225a, 230a at an edge 235a, 235b. In an embodiment, each of the overhang segments 225b, 230b may extend toward a center of the TC connector 200, thereby overhanging a portion of the surface 205 and, in some embodiments, an area of the concave portion 210.

Figure 3:
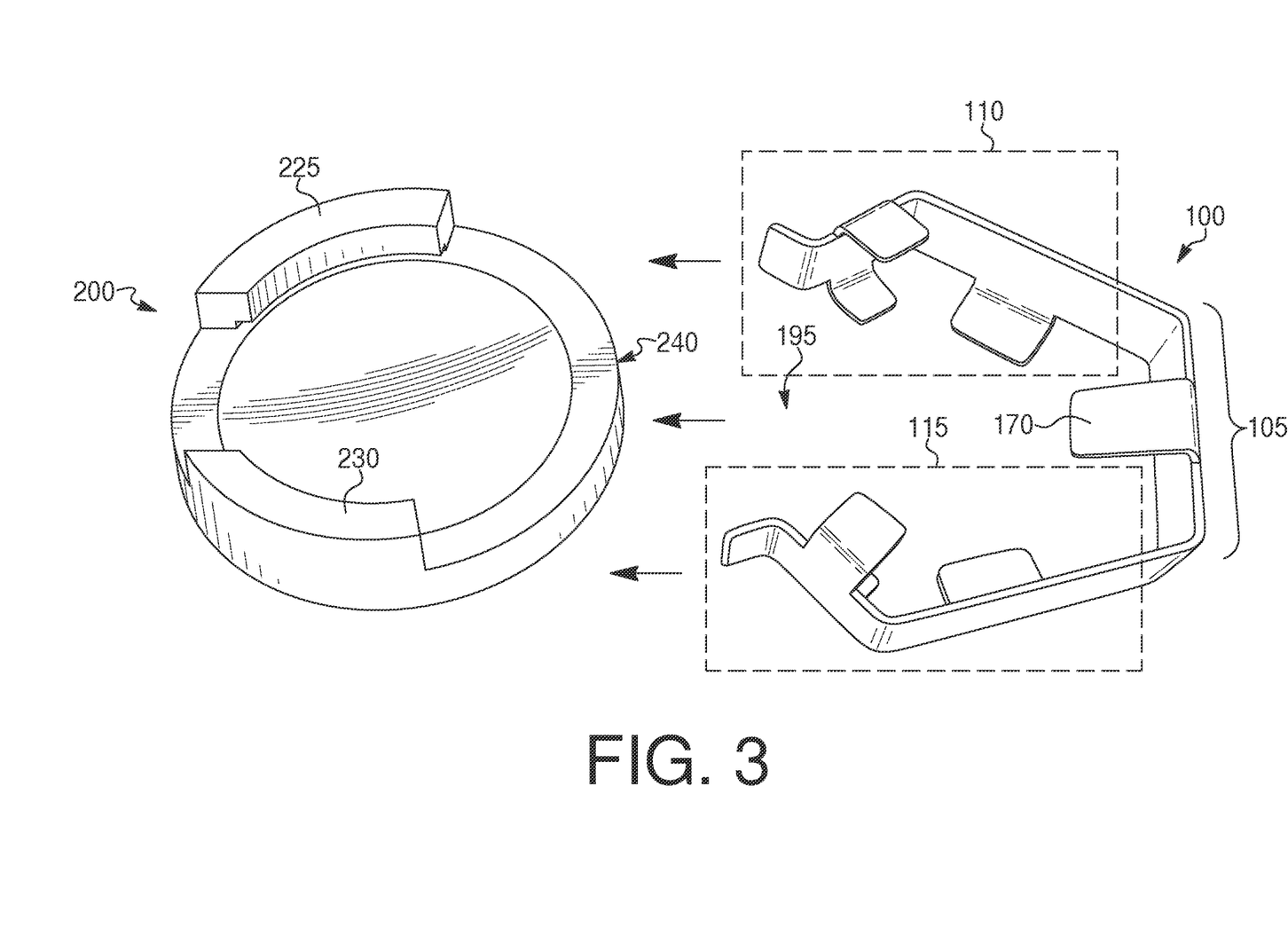
FIG. 3 depicts an exemplary process of attaching a connecting device to a bracketing device, according to various aspects of the present disclosure.
Figure 4:
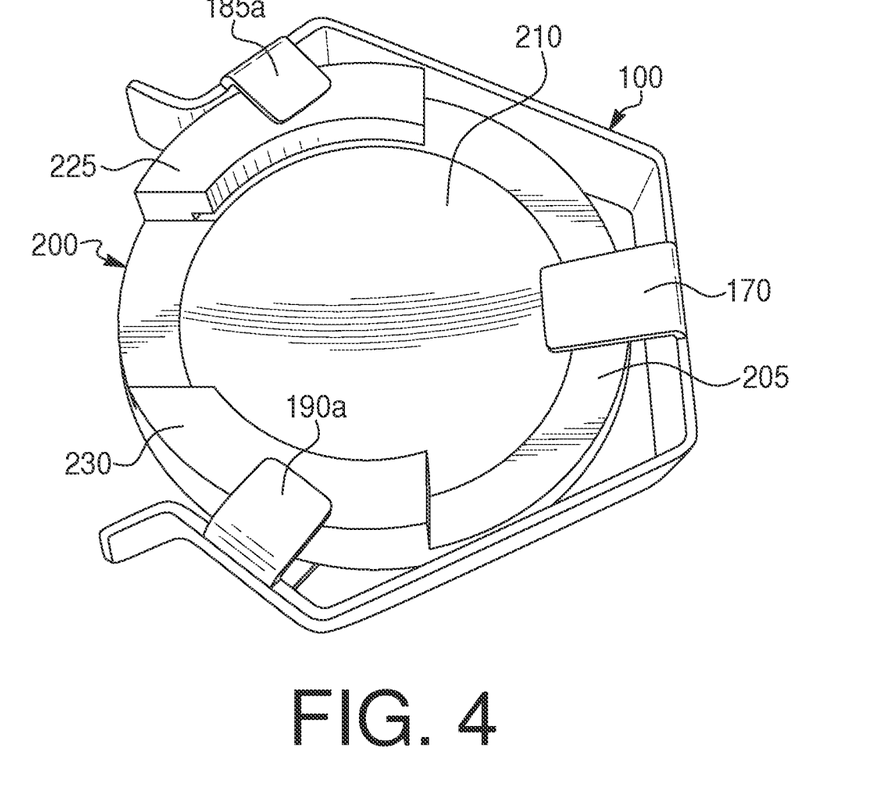
FIG. 4 depicts a perspective view of a connecting device secured by a bracketing device, according to various aspects of the present disclosure.

Turning now to FIG. 3, an exemplary illustration showing how the TC connector 200 may be attached to the bracketing device 100 is provided. More particularly, the bracketing device 100 may be configured to wrap around the TC connector 200 via manual movement of a back end 240 of the TC connector 200 through an opening 195 (i.e. a space between the side sections 110, 115) of the bracketing device 100 and toward the end connecting section 105. Attachment may be achieved when the back end 240 of the TC connector 200 is secured by the end bracket 170 and each of the gripping components 225, 230 is secured by one of the two sets of securing bracket pairs 185, 190, as illustrated in FIG. 4. In this regard, the end bracket 170 may wrap around a portion of the surface 205 corresponding to the back end 220 of the TC connector 200 and correspondingly provide a compressive downward force to the base portion 210, thereby securing the TC connector 200 between the support brackets 175, 180 and the end bracket 170. Furthermore, each of the first securing brackets 185a, 190a may contact the overhang segments 225b, 230b and extend over at least a portion of the surface thereon. Each of the second securing brackets 185b, 190b may contact an outside surface (not shown) of the TC connector 200, thereby further securing the TC connector between the first securing brackets 185a, 190a and the second securing brackets 185b, 190b.

Figure 5:
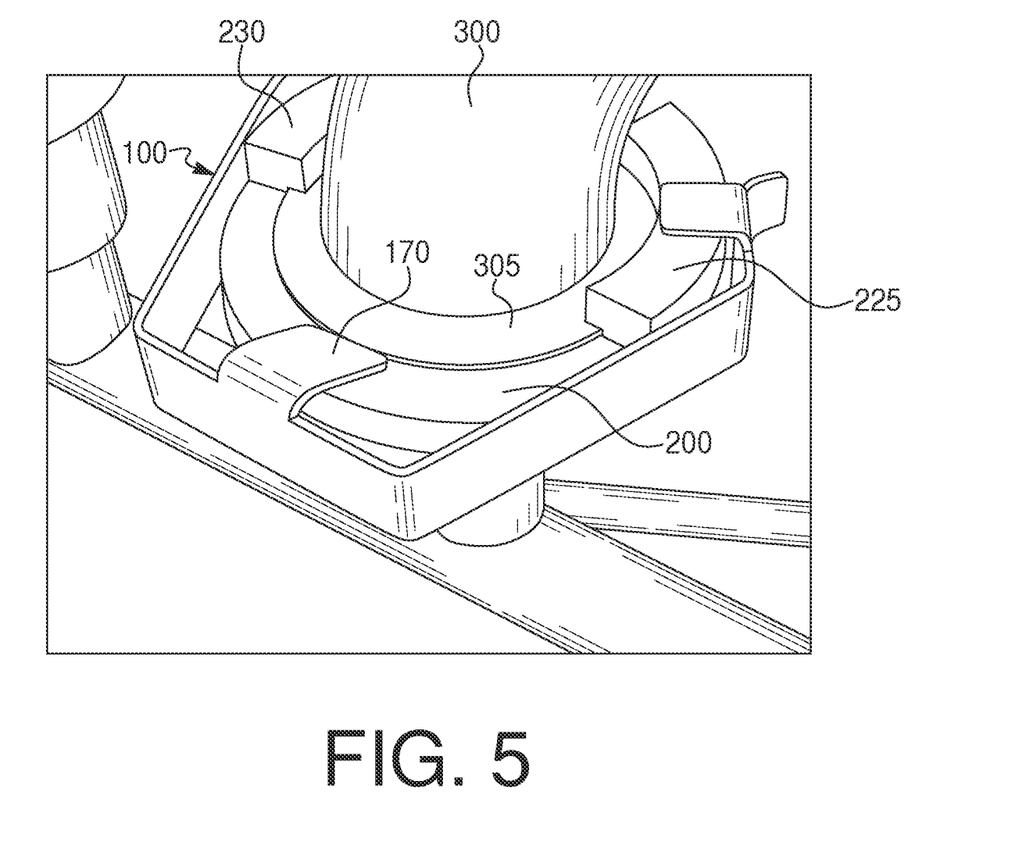
FIG. 5 depicts a perspective view of a piece of equipment attached to a connecting device that is secured by a bracketing device, according to various aspects of the present disclosure.

Turning now to FIG. 5, an equipment part attached to a TC connector that is secured by a bracketing device is provided. In the illustration, the equipment part 300 is an elbow connector, however, such a designation is exemplary and not intended to be limiting. In an embodiment, a lip portion 305 of the equipment part 300 may be secured to the TC connector 200 via insertion of the lip portion 305 between the space provided by the overhang segments 225b, 230b of the gripping components 225, 230 and the corresponding surface 205 portions. In such an attached configuration, the bracketing device 100 may prevent expansion of the TC connector 200 and/or loosening of the gripping components 225, 230 from occurring due to the rigid frame of the bracketing device 100 and by the compressive forces provided thereby. Accordingly, the equipment part 300 may be securely maintained in place during operation of a washer.

In an embodiment, the bracketing device 100 may be a single, dedicated object that is configured to secure a single TC connector 200. Once secured, the bracketing device may be positioned on a rack inside the washer. Additionally or alternatively, in another embodiment, the bracketing device 100 may be a component of a larger unit (not illustrated) that may contain two or more integrated bracketing devices. In this embodiment, the larger unit may be configured to secure two or more TC connectors, each associated with a bracketing device, and therefore configured to secure a multitude of equipment pieces.

Embodiments of the present disclosure may include the following features:

Item 1. A bracketing device configured to secure a connector, the bracketing device comprising:
- a first side section comprising:
  - a first subsection comprising a first supporting bracket;
  - a second subsection connected to the first subsection, wherein the second subsection comprises a first securing bracket pair; and
  - a third subsection connected to the second subsection;
- a second side section comprising:
  - a fourth subsection comprising a second supporting bracket;
  - a fifth subsection connected to the fourth subsection, wherein the fifth subsection comprises a second securing bracket pair; and
  - a sixth subsection connected to the fifth subsection; and
- an end connecting section positioned between the first side section and the second side section, wherein the end connecting section comprises an end bracket.

Item 2. The bracketing device of claim 1, wherein the bracketing device is composed of stainless steel.

Item 3. The bracketing device of claim 2, wherein the stainless steel is of a predetermined gauge.

Item 4. The bracketing device of claim 1, wherein the first securing bracket pair comprises a first securing bracket and a second securing bracket and wherein the second securing bracket pair comprises a third securing bracket and a fourth securing bracket.

Item 5. The bracketing device of claim 4, wherein the first securing bracket and the third securing bracket are integrated into a first side edge of the bracketing device and wherein the second securing bracket and the fourth securing bracket are integrated into a second side edge of the bracketing device.

Item 6. The bracketing device of claim 1, wherein the first securing bracket pair is positioned along a midway point of the second subsection and wherein the second securing bracket pair is positioned along a midway point of the fifth subsection.

Item 7. The bracketing device of claim 1, wherein each of the first supporting bracket and the second supporting bracket are integrated into a second side edge of the bracketing device.

Item 8. The bracketing device of claim 7, wherein the first supporting bracket is positioned at a first midway point along the second side edge of the first subsection and wherein the second supporting bracket is positioned at a second midway point along the second side edge of the fourth subsection.

Item 9. The bracketing device of claim 1, wherein the end bracket is integrated into a first side edge of the end connecting section of the bracketing device.

Item 10. The bracketing device of claim 9, wherein the end bracket is positioned at a midway point along the first side edge of the end connecting section.

Item 11. An equipment securing device, comprising:
- a connector configured to secure an equipment part, wherein the connector comprises a first gripping component and a second gripping component;
- a bracketing device that is attached to and at least partially surrounds the connector, wherein the bracketing device comprises:
  - a first side section comprising:
    - a first subsection comprising a first supporting bracket;
    - a second subsection connected to the first subsection, wherein the second subsection comprises a first securing bracket pair; and
    - a third subsection connected to the second subsection;
  - a second side section comprising:
    - a fourth subsection comprising a second supporting bracket;
    - a fifth subsection connected to the fourth subsection, wherein the fifth subsection comprises a second securing bracket pair; and
    - a sixth subsection connected to the fifth subsection; and
  - an end connecting section positioned between the first side section and the second side section, wherein the end connecting section comprises an end bracket;
- wherein the first securing bracket pair is clamped around the first gripping component, wherein the second securing bracket pair is clamped around the second gripping component, and wherein the end bracket is clamped on a first end of the connector.

Item 12. The equipment securing device of claim 11, wherein the connector is a tri-clamp (TC) connector.

Item 13. The equipment securing device of claim 11, wherein the connector is composed of a plastic material.

Item 14. The equipment securing device of claim 11, wherein the bracketing device is composed of stainless steel.

Item 15. The equipment securing device of claim 11, wherein the first securing bracket pair comprises a first securing bracket and a second securing bracket and wherein the second securing bracket pair comprises a third securing bracket and a fourth securing bracket.

Item 16. The equipment securing device of claim 11, wherein each of the first supporting bracket and the second supporting bracket are integrated into a second side edge of the bracketing device and wherein the first supporting bracket is positioned at a first midway point along the second side edge of the first subsection and wherein the second supporting bracket is positioned at a second midway point along the second side edge of the fourth subsection.

Item 17. The equipment securing device of claim 11, wherein the end bracket is integrated into a first side edge of the end connecting section of the bracketing device and wherein the end bracket is positioned at a midway point along the first side edge of the end connecting section.

Item 18. A method of securing a connector to a bracketing device, the method comprising:
- clamping a first gripping component of the connector between a first securing bracket pair of the bracketing device;
- clamping a second gripping component of the connector between a second securing bracket pair of the bracketing device; and
- clamping a first end of the connector between an end bracket and first supporting bracket and a second supporting bracket of the bracketing device.

Item 19. The method of claim 18, wherein the first securing bracket pair is positioned on a second subsection of the bracketing device, wherein the second securing bracket pair is positioned on a fifth subsection of the bracketing device, wherein the end bracket is positioned on an end connecting section of the bracketing device, wherein the first supporting bracket is positioned on a first subsection of the bracketing device, and wherein the second supporting bracket is positioned on a fourth subsection of the bracketing device.

Item 20. The method of claim 18, further comprising securing an equipment part to the connector via:
  inserting a portion of the equipment part between a first space created by a first overhang section of the first gripping component with respect to a surface of the connector and a second space created by a second overhang section of the second gripping component with respect to the surface.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A bracketing device configured to secure a connector, the bracketing device comprising:
  a first side section comprising:
    a first subsection comprising a first supporting bracket;
    a second subsection connected to the first subsection, wherein the second subsection comprises a first securing bracket pair; and
    a third subsection connected to the second subsection;
  a second side section comprising:
    a fourth subsection comprising a second supporting bracket;
    a fifth subsection connected to the fourth subsection, wherein the fifth subsection comprises a second securing bracket pair; and
    a sixth subsection connected to the fifth subsection; and
  an end connecting section positioned between the first side section and the second side section, wherein the end connecting section comprises an end bracket.

2. The bracketing device of claim 1, wherein the bracketing device is composed of stainless steel.

3. The bracketing device of claim 2, wherein the stainless steel is of a predetermined gauge.

4. The bracketing device of claim 1, wherein the first securing bracket pair comprises a first securing bracket and a second securing bracket and wherein the second securing bracket pair comprises a third securing bracket and a fourth securing bracket.

5. The bracketing device of claim 4, wherein the first securing bracket and the third securing bracket are integrated into a first side edge of the bracketing device and wherein the second securing bracket and the fourth securing bracket are integrated into a second side edge of the bracketing device.

6. The bracketing device of claim 1, wherein the first securing bracket pair is positioned along a midway point of the second subsection and wherein the second securing bracket pair is positioned along a midway point of the fifth subsection.

7. The bracketing device of claim 1, wherein each of the first supporting bracket and the second supporting bracket are integrated into a second side edge of the bracketing device.

8. The bracketing device of claim 7, wherein the first supporting bracket is positioned at a first midway point along the second side edge of the first subsection and wherein the second supporting bracket is positioned at a second midway point along the second side edge of the fourth subsection.

9. The bracketing device of claim 1, wherein the end bracket is integrated into a first side edge of the end connecting section of the bracketing device.

10. The bracketing device of claim 9, wherein the end bracket is positioned at a midway point along the first side edge of the end connecting section.

11. An equipment securing device, comprising:
  a connector configured to secure an equipment part, wherein the connector comprises a first gripping component and a second gripping component;
  a bracketing device that is attached to and at least partially surrounds the connector, wherein the bracketing device comprises:
    a first side section comprising:
      a first subsection comprising a first supporting bracket;
      a second subsection connected to the first subsection, wherein the second subsection comprises a first securing bracket pair; and
      a third subsection connected to the second subsection;
    a second side section comprising:
      a fourth subsection comprising a second supporting bracket;
      a fifth subsection connected to the fourth subsection, wherein the fifth subsection comprises a second securing bracket pair; and
      a sixth subsection connected to the fifth subsection; and
    an end connecting section positioned between the first side section and the second side section, wherein the end connecting section comprises an end bracket;
  wherein the first securing bracket pair is clamped around the first gripping component, wherein the second securing bracket pair is clamped around the second gripping component, and wherein the end bracket is clamped on a first end of the connector.

12. The equipment securing device of claim 11, wherein the connector is a tri-clamp (TC) connector.

13. The equipment securing device of claim 11, wherein the connector is composed of a plastic material.

14. The equipment securing device of claim 11, wherein the bracketing device is composed of stainless steel.

15. The equipment securing device of claim 11, wherein the first securing bracket pair comprises a first securing bracket and a second securing bracket and wherein the second securing bracket pair comprises a third securing bracket and a fourth securing bracket.

16. The equipment securing device of claim 11, wherein each of the first supporting bracket and the second supporting bracket are integrated into a second side edge of the bracketing device and wherein the first supporting bracket is positioned at a first midway point along the second side edge of the first subsection and wherein the second supporting bracket is positioned at a second midway point along the second side edge of the fourth subsection.

17. The equipment securing device of claim 11, wherein the end bracket is integrated into a first side edge of the end connecting section of the bracketing device and wherein the end bracket is positioned at a midway point along the first side edge of the end connecting section.

18. A method of securing a connector to a bracketing device, the method comprising:
- clamping a first gripping component of the connector between a first securing bracket pair of the bracketing device;
- clamping a second gripping component of the connector between a second securing bracket pair of the bracketing device; and
- clamping a first end of the connector between an end bracket and first supporting bracket and a second supporting bracket of the bracketing device.

19. The method of claim 18, wherein the first securing bracket pair is positioned on a second subsection of the bracketing device, wherein the second securing bracket pair is positioned on a fifth subsection of the bracketing device, wherein the end bracket is positioned on an end connecting section of the bracketing device, wherein the first supporting bracket is positioned on a first subsection of the bracketing device, and wherein the second supporting bracket is positioned on a fourth subsection of the bracketing device.

20. The method of claim 18, further comprising securing an equipment part to the connector via:
- inserting a portion of the equipment part between a first space created by a first overhang section of the first gripping component with respect to a surface of the connector and a second space created by a second overhang section of the second gripping component with respect to the surface.

* * * * *